(12) United States Patent
Buffet

(10) Patent No.: US 8,840,499 B2
(45) Date of Patent: Sep. 23, 2014

(54) FLYWHEEL TO RECOVER KINETIC ENERGY FOR HYBRID VEHICLE WHICH HAS TWO PLANETARY GEARS MECHANISMS FOR POWER DERIVATION

(76) Inventor: Denis Ernest Celestin Buffet, Paris (FR)

( * ) Notice: Subject to any disclaimer, the term of this patent is extended or adjusted under 35 U.S.C. 154(b) by 174 days.

(21) Appl. No.: 13/371,697

(22) Filed: Feb. 13, 2012

(65) Prior Publication Data
US 2012/0309575 A1      Dec. 6, 2012

(51) Int. Cl.
| | |
|---|---|
| F16H 3/56 | (2006.01) |
| F16H 3/72 | (2006.01) |
| F16H 37/06 | (2006.01) |
| B60K 6/10 | (2006.01) |
| B60K 6/445 | (2007.10) |
| F16H 37/08 | (2006.01) |

(52) U.S. Cl.
CPC ............ B60K 6/445 (2013.01); *Y02T 10/6282* (2013.01); B60K 6/105 (2013.01); *Y02T 10/6239* (2013.01); *F16H 2037/0866* (2013.01); *Y02T 10/6204* (2013.01)
USPC .............................................. 475/5; 475/151

(58) Field of Classification Search
USPC ............................... 475/5, 149–152; 903/910
See application file for complete search history.

(56) References Cited

U.S. PATENT DOCUMENTS

| | | | |
|---|---|---|---|
| 7,288,041 B2 * | 10/2007 | Bucknor et al. ................... | 475/5 |
| 2010/0304920 A1 * | 12/2010 | Simon ................................ | 475/5 |
| 2012/0196713 A1 * | 8/2012 | He et al. ............................ | 475/5 |
| 2012/0196721 A1 * | 8/2012 | He et al. ............................ | 475/5 |

* cited by examiner

Primary Examiner — Jacob S Scott

(57) ABSTRACT

A series-parallel hybrid vehicle which uses two planetary gear mechanisms, the first one (4) dedicated to low vehicle speeds and the second (5) dedicated to high vehicle speeds. The two planetary gear mechanisms include pilot shafts (3rd shafts) which are alternatively coupled to an electric generator (3); output shafts which drive the wheels (9) through a differential (6); and input shafts which receive power from an engine (1). An electrical motor (2) drives the wheels in parallel with the two planetary gear mechanisms. A flywheel (85), less than 1% of the vehicle weight, is coupled to the generator (3) to store kinetic energy of the vehicle during decelerations. The planetary gear mechanisms makes possible higher efficiency at low vehicle speeds where decelerations are frequents. The energy storage performance of the flywheel equals that of ultra-capacitors.
The system provides improvements regarding over torque protection and power-train arrangement.

10 Claims, 8 Drawing Sheets

FLYWHEEL TO RECOVER KINETIC ENERGY FOR HYBRID VEHICLE WHICH HAS TWO PLANETARY GEARS MECHANISMS FOR POWER DERIVATION

RELATED APPLICATION

This application is an improvement of the invention described in the patent application Ser. No. 13/118,662 filed on May 31, 2011 under the following title: high efficiency hybrid vehicle with two planetary gears mechanisms for power derivation.

FIELD OF THE INVENTION

The invention relates generally to a system for propelling hybrid vehicle which combines both thermic and electric propulsions. More particularly this invention relates to vehicles, wherein the power split is made by a planetary gears mechanism for power derivation, also known as "series-parallel" vehicle type.

BACKGROUND OF THE INVENTION

In conventional vehicles, energy dissipated by braking is lost in form of heat inside the brakes. The energy losses are important because, for example, they can reduce the mileage of an electric vehicle in town traffic of half. Moreover its global energy efficiency is seriously affected.

Several systems for regenerative braking already exist. They can be classified in three families according to their energy storage: battery, capacitor, and flywheel. Some other storage techniques exist but they are not developed or marketed yet.

The power involved in a braking is often much higher than the storage capability whatsoever the storage system in place. Consequently we can usually store only part of the lost energy. For a standard vehicle, the power involved in an emergency braking can exceed 200 KW whereas less than 10 KW can be usually absorbed by a battery under a lot of restrictive conditions regarding its lifetime. Manufacturers mitigate this problem by increasing the battery size to the detriment of the cost and by recovering only a small part of the kinetic energy.

Ultra capacitors can stand much higher power but their storage capacities are low. In addition, this technique is expensive not only due to the capacitors price but also due to the electronic equipment's required to deal with the voltage variations inherent to the capacitors. Moreover, with today practical energy densities of about 2 Wh/Kg, the weight and the volume of the system are far from being negligible for a vehicle.

Flywheels are known for a long time. They have the disadvantage of being heavy, dangerous and they scarcely exceed 2 Wh/Kg. However they appear on some vehicles for competition or public transport in very particular conditions.

SUMMARY OF THE INVENTION

The purpose of the device according to the present invention is to improve the here above situation which is not satisfying. The double planetary gears mechanism for power derivation as described in the patent application U.S. Ser. No. 13/118,662 can bring some big improvements to the flywheel solution. For that the generator used in this system gets a high inertia either with an heavy rotor or with an additional flywheel directly coupled to the rotor or indirectly through a step up gear or a pulleys and belt system.

We will explain later how the system takes advantage of the two planetary gears mechanisms.

We also take the opportunity to bring some other improvements to the system regarding: the reverse gear, the selector of the planetary gears mechanism, the over torque protection.

By using the planetary gears mechanism normally dedicated to the high vehicle speed for the reverse gear we can limit the maximum speed of the generator and get a better arrangement of the power-train.

By replacing the double clutch selector by a gear type selector, we can mix the step-up gear and the selection functions. In addition we can have up to five positions corresponding to five vehicle modes: low speed, high speed, neutral, parking and pure thermic.

By installing a torque limiter on the flywheel or the generator rotor according to the invention we protect not only the generator shaft but also all other shafts of the power-train against over torques.

Note that the device according to the invention can be installed either in "upstream configuration" which implies that the main electric motor is coupled between the thermal engine and the planetary gears mechanisms or in "downstream configuration" which implies that the main electric motor is coupled between the planetary gears mechanisms and the wheels.

Basically the flywheel arrangement is made for hybrid mode that means electric and thermal drives simultaneously. But kinetic energy storage in the flywheel can also work in pure electric mode provide that we are in down steam configuration with selector in neutral position.

Also note that our target is to limit the flywheel weight at 1% of the weight of the vehicle and not increase the vehicle inertia.

DETAILED DESCRIPTION

First we have to remind the main characteristics of the power-train architecture described in the patent application U.S. Ser. No. 13/118,662: the thermal engine and the electrical motor drive in parallel two planetary gears mechanisms of different ratio, themselves driving in parallel the differential gear of the axle and whose pilot shafts are alternatively coupled up to the electric generator. One planetary gears mechanism is dedicated to low vehicle speeds while the other is dedicated to high vehicle speeds. But, before going into details about kinetic energy, we would like to introduce an improvement to the here above device.

Even if the reverse speed of the vehicle is low it is better to use the planetary gears mechanism dedicated to the high speeds for reverse gear. This choice considerably decreases the maximum speed of the generator. It allows a better use of the generator and has a positive impact on many compromises at the design level. Even if the performances in reverse gear are lower they are still acceptable. It's a big advantage of the double planetary gears mechanism just after the reduction of the derived power.

The improved architecture of the power-train can be now summarized as follow. The thermal engine drives two planetary gears mechanisms of different ratios, one dedicated to the low vehicle speeds and the other to the high vehicle speeds and to the reverse gear, themselves driving in parallel with the electrical motor the wheels and whose pilot shafts are alternatively coupled to the electric generator according to the vehicle speed.

Our aim is not to store all the kinetic energy of the vehicle but only when it is easy and effective to do. In town traffic, therefore at low speed, decelerations are less powerful but much more frequent than decelerations on highways at high speed. In addition the available energy is less cut down by the running resistance forces on the vehicle. Consequently, to target the best of the energy which can be stored, the variations of the rotation speed of the flywheel should be concentrated at low speed and limited at high-speed of the vehicle. What the devices according to the patent application U.S. Ser. No. 13/118,662 can do.

For convenience, we have kept the same denominations than in the patent application U.S. Ser. No. 13/118,662: the input shaft of the planetary gears mechanism is the shaft driven by the thermal engine; the output shaft of planetary gears mechanism is the shaft connected to the wheels and the 3rd shaft or pilot shaft of the planetary gears mechanism is the shaft whose torque is controlled by the generator.

With the planetary gears mechanism dedicated to the low vehicle speeds, the rotation speed of the pilot shaft, therefore of the generator, is ranging from 2000 to 6000 rpm. With the planetary gears mechanism dedicated to the vehicle high speeds, the rotation speed of the pilot shaft, therefore of the generator is only ranging from 100 to 500 rpm. As the gears ratios of the planetary gears mechanisms are negative, the variation of the rotation speed of the output shaft, therefore of the wheels, and the variation of the rotation speed of the pilot shaft, therefore of the flywheel, are opposed. When the vehicle speed increases, the speed of the flywheel decreases and when the vehicle speed decreases the speed of the flywheel increases. The flywheel is able to store more energy at low vehicle speed than at high vehicle speed because higher rotation speed and larger variations. Thus the system is more effective at low vehicle speed. Note that the energy transfer uses mainly the electrical link between the generator and the motor while the mechanical link through the planetary gears mechanisms might be limited by the reverse torque on the thermal engine.

In a first alternative, the flywheel is coupled with the generator shaft by a belt which has also the virtue to filter vibrations induced by the flywheel, or by any other transmission system having the same function.

In a more compact alternative, the flywheel is integrated into the generator housing in order to limit the number of parts, therefore the cost. Moreover, the similar results can be obtained with a generator which has got a high inertia rotor.

In order to reduce the flywheel and the generator weight it's better to increase their rotation speed and to combine the step up gear and the selector of the planetary gears mechanisms. Consequently the gear selector is able to select the pilot shaft to be connected to the generator and simultaneously to increase its speed. It can be arranged by a sliding pinion on the pilot shaft in order to be engaged with the gear of the chosen pilot shaft which has more teeth than the pinion. The shifting and the engagement are made when the rotation speeds of shafts which can be accurately deducted from the generator and the motor rotation speeds are compatible. Basically the gears of the pilot shafts are the same and the step up ratios too, but they might be different.

The moving and the positioning of the generator pinion required an actuator which is advantageously based on a step-motor in order to insure up to five accurate positions with feedback information according to known technologies. The linear moving with the positioning functions can be realized or combined with various well known techniques such as fluid jacks, electromagnetic jacks, linear motors, racks and pinions, screws, levers, etc. . . . .

While a pilot shaft is geared, the generator pinion can move a little further in order to also engage a fixed gear in order to lock the corresponding pilot shaft inside the housing. Obviously this last operation can be performed only when the generator speed is null and when we want either to operate the vehicle in pure thermal mode or to get some engine brake for parking.

It is also possible to incorporate a torque limiter in order to protect not only the geared pilot shaft but also the whole power-train in case of wheels jamming which can occur during an emergency braking for instance. As in a conventional vehicle, the torque limitation is ensured by a slipping disc (in the clutch for conventional car). But, by integrating this function at the flywheel level, the device takes a very small size due to the high speed there and its exceptional use. Moreover, it can protect the whole power-train unit because of the torques proportionality on the shafts in a planetary gears mechanism.

Architecture is thus characterized by two planetary gears mechanisms of different ratios, one dedicated to the low speeds of the vehicle and the second dedicated to the high speeds of the vehicle, whose pilot shafts are alternatively connected through a selector gear to an electric generator associated to a flywheel or to a high inertia generator, whose input shafts are driven by the thermal engine, whose output shafts drive the mechanical chain connected to the wheels. The gear selector is characterized by an axially sliding pinion on the generator shaft which is moved and positioned by a linear actuator in order to alternatively gear the chosen pilot shaft or to insure a neutral position or to lock the chosen pilot shaft. The system is also characterized by a torque limiter base on a sliding disc inserted between the flywheel and the pilot shaft in order to prevent over torque in the power-train in case of wheels jamming.

To store kinetic energy in the flywheel is still possible in pure electric mode but only in upstream configuration and neutral position. In this case, the generator working as a motor drives the flywheel to store the electrical energy coming from the motor working as a generator to decelerate the vehicle.

To move from electric mode to hybrid mode, it is necessary to start the thermal engine while an important part of the electric power is already consumed in the electric propulsion. Especially if the power is limited for economic reasons, the power to start the thermal engine might be missing. The flywheel can help by supplying more than half of the additional power. For that the generator should have accelerated the flywheel to the adequate rotation speed before been geared to the high speed pilot shaft. Then the thermal engine can be started in hybrid mode. The low speed pilot shaft can also be geared but the gear ratio is less favorable to start the thermal engine.

At the beginning of the here above operation the velocity of the flywheel is negative. To be close to the startup conditions the pure electric operations of the vehicle are carried out with the generator and the flywheel in negative rotation speed and with the gear selector in neutral position. So we will not have to change the rotation direction of the flywheel before its synchronization to the pilot shaft.

The device according to the invention can also be associated with the other means of energy storage like battery, ultra-condenser in order to draw advantage from their association.

The patent application U.S. Ser. No. 13/118,662 describes an optional and additional battery or a battery capacity reserve only refillable through the national electrical grid and not refillable by the on-board generator, in order to perfectly identify the power source regarding either the grid or the on-board fuel. They are many reasons to do that: tax, commercial and even energy efficiency. The device according to the invention contributes to this aim by dealing the kinetic energy outside the battery which eases the energy source identification.

By way of a nonrestrictive example the flywheel has, a mass of 11 kg (less than 1% of the weight of the vehicle), a rotation speed of 18 000 rpm, and a kinetic energy of 140 KJ. Under these conditions, the energy ratio is 2.7 Wh/Kg ranking the system at the level of ultra-capacitors. The maximum stress in the flywheel is 30 kg/mm² which allows good safety factor with adequate material. These figures belong to well known and reliable technologies but even today we can already do much better.

As described in the patent application U.S. Ser. No. 13/118, 662, the main advantage of the double planetary gears mechanism for power derivation is to reduce of half the derived power and consequently it minimizes the nominal size of the electrical equipment's and so far their relevant costs. But the device according to the present invention has another big advantage. At high speed with the planetary gears mechanism dedicated to high speed, the kinematic is such that the flywheel does not significantly increase the vehicle global inertia. Consequently the flywheel does not harm vehicle performances at high speed.

DETAILED DESCRIPTION OF THE ILLUSTRATED EMBODIMENTS

Figure 1:
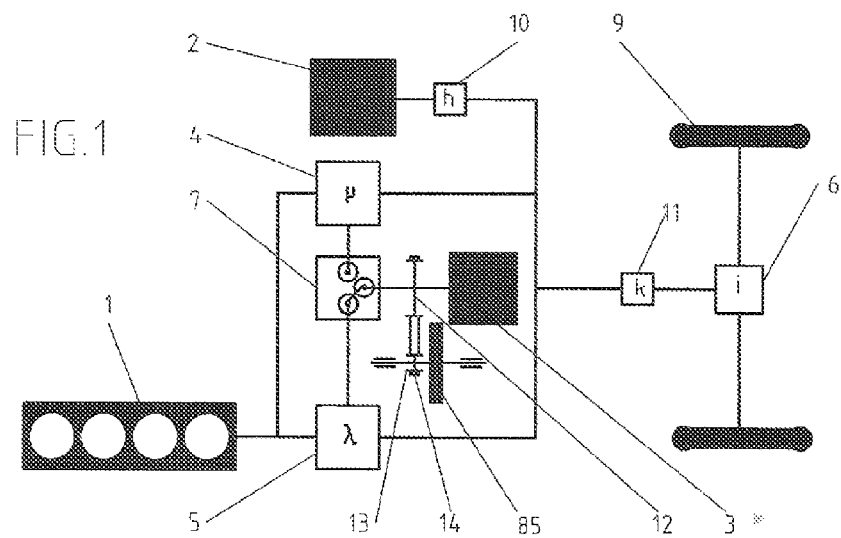
FIG. 1 to FIG. 3 schematize in principle the power-train architecture of a hybrid vehicle according to the patent application U.S. Ser. No. 13/118,662 which has been improved.
Figure 2:
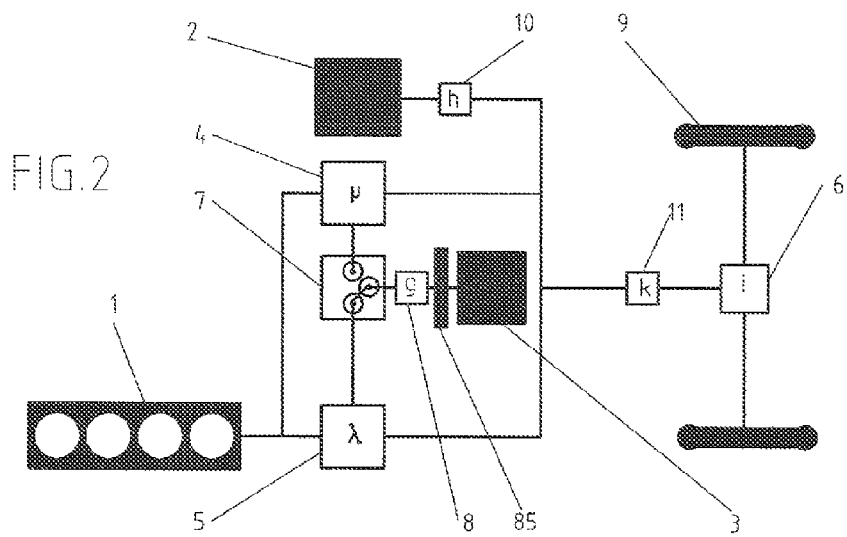
Figure 3:
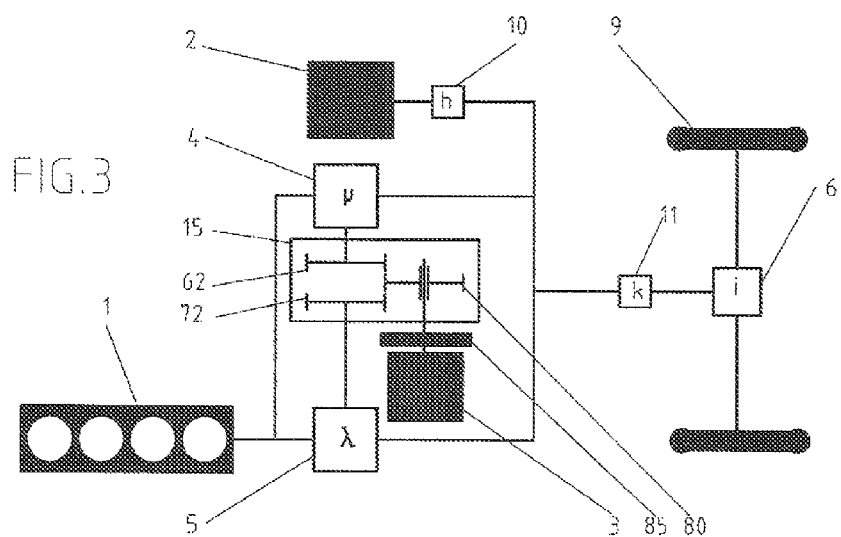

FIG. 1 to FIG. 3 schematize in principle the power-train architecture of a hybrid vehicle according to the patent application U.S. Ser. No. 13/118,662 which has been improved by the present patent application in order to recover more kinetic energy from the vehicle. The thermal engine (1) drives two planetary gears mechanisms (4) and (5) which themselves drive the mechanical chain to the wheels (9) through the differential (6). The two planetary gears mechanisms have two different gear ratios, one is dedicated to low vehicle speeds and the other to high vehicle speeds. Thanks to the selector (7) their pilot shafts are alternatively connected to a generator (3) whose electric power is either consumed in the motor (2) or stored in the vehicle battery. On the figures the electric motor (3) is coupled up between the two planetary gears mechanisms (4) and (5) and the differential (6) in a "downstream configuration" but it could be coupled up between the thermal engine (1) and the two planetary gears mechanisms (4) and (5) in a "upstream configuration". Note that the configuration does not change anything to the present invention except for the pure electric mode as indicated latter. The fixe ratio gear boxes (10) and (11) insure the speed adaptations as necessary.

On the FIG. 1 the flywheel (85) is connected to the generator (3) shaft by a system of pulleys (12), (13) and belt (14).

On the FIG. 2 the flywheel (85) is installed directly on the generator (3) shaft which speed is increased by a step-up gear (8).

On the FIG. 3 the gear system (8) and the selector (7) are mixed. The pinion (80) driven by the generator (3) can axially slip on the generator shaft in order to gear either the gear (62) or the gear (72). The gear (62) is connected to the pilot shaft of the low speed planetary gears mechanism while the gear (72) is connected to the pilot shaft of the high speed planetary gears mechanism.

Figure 4:
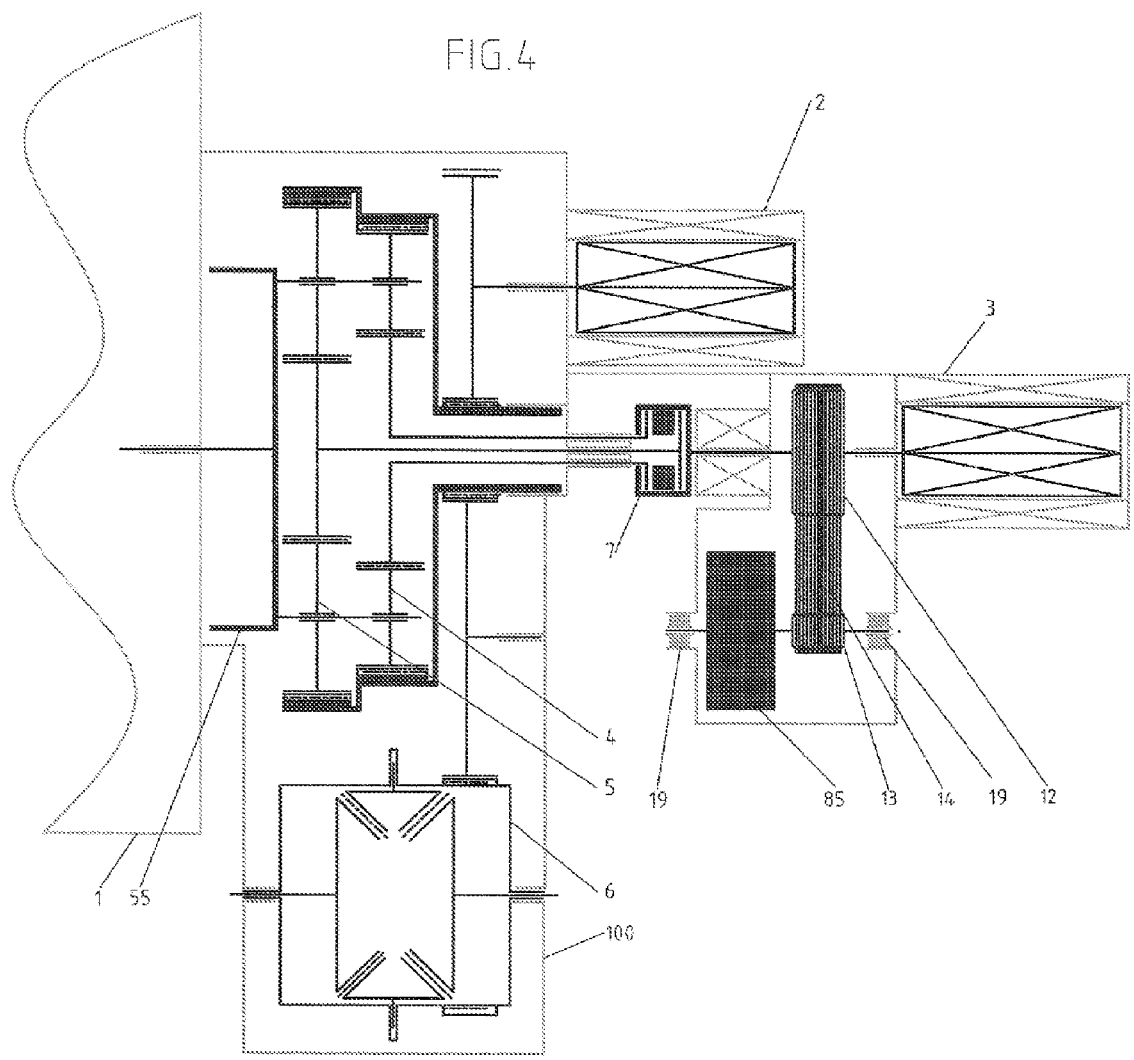
FIG. 4: The figure geographically schematizes the power-train architecture in the FIG. 1 option.

FIG. 4: The figure geographically schematizes the power-train architecture already defined in principle by the FIG. 1. Nevertheless, the figure shows more details regarding the two springy bearings (19) of the flywheel and regarding the damper (55) of the thermal engine (1), the two for vibrations reduction purpose.

Figure 5:
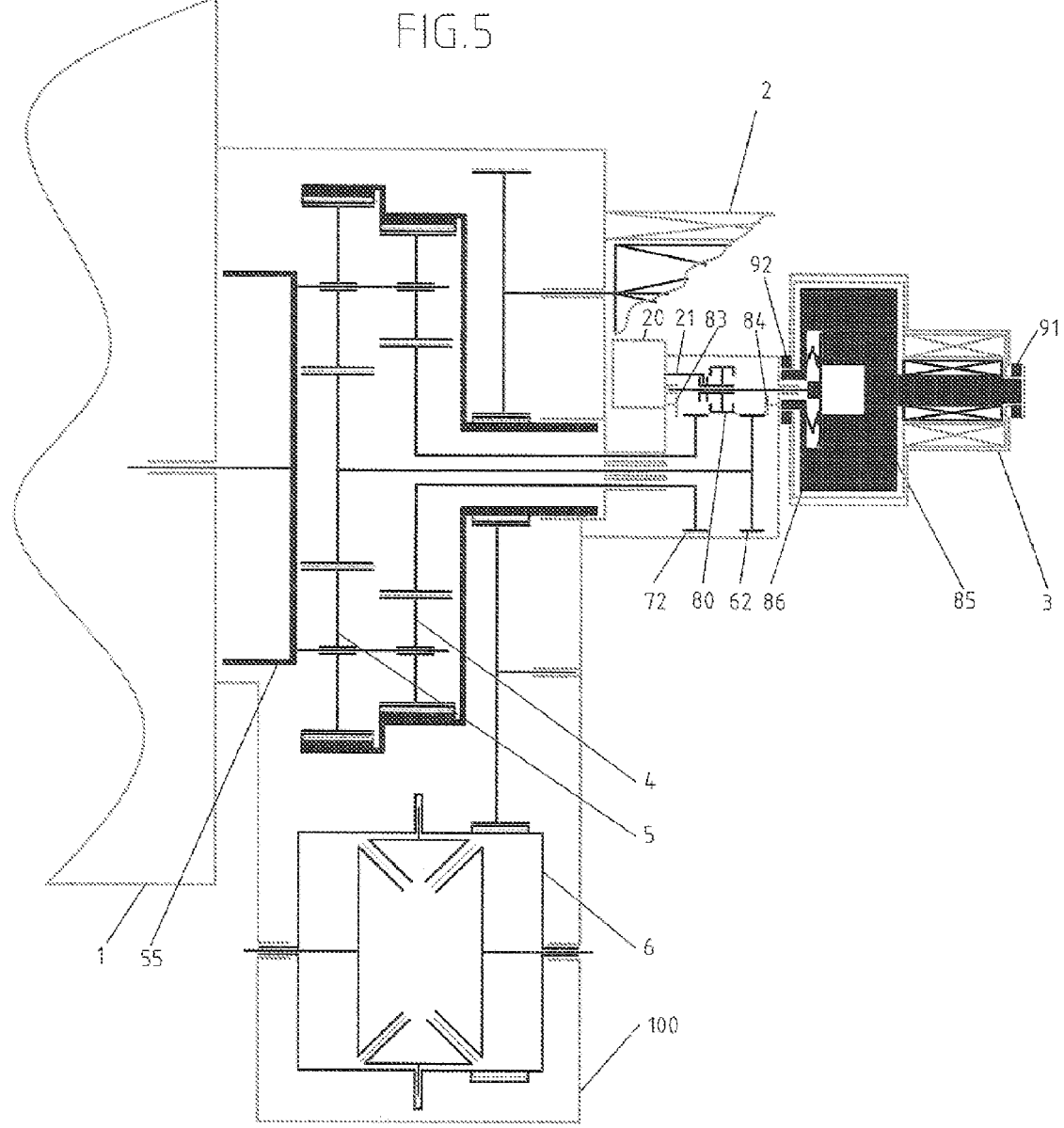
FIG. 5: The figure geographically schematizes the power-train architecture in the FIG. 3 option.

FIG. 5: The figure geographically schematizes the power-train architecture already defined in principle by the FIG. 3. Nevertheless the figure shows more details regarding particular points.

The sliding pinion (80) has got front teeth on each side. These teeth can gear either with the fixed gear (83) to lock the gear (72) or with the fixed gear (84) to lock the gear (62). The first option locks the planetary gears mechanism (5) dedicated to low speed and is useful to get engine brake for vehicle in parking situation. The second option locks the planetary gears mechanism (4) dedicated to high speed and is useful to get pure thermal propulsion at high speed. Note that we can also get pure thermal propulsion with the planetary gears mechanism (5) dedicated to low speed; but the shift should be done only at the startup of the thermal engine while the vehicle is running. So we have until five positions in which some might be optional depending of the vehicle specification: Neutral, high speed, low speed, parking, thermal. Note that the gears (81) (83) and (84) are not necessary a completed circumference and on the figure the V end shape of pinion (80) teeth are used, but it also can be dedicated front teeth carved out of its lateral faces.

An actuator (20) insures the axial moving and the positioning of the pinion (80) according to known technologies built around step motors, jacks, linear motors and so on. The gear engagements occur at appropriate speeds which can be accurately deducted and calculated from the generator and the motor resolvers. Note that only two resolvers are sufficient for knowing the rotation speed of all the shafts including the engine and vehicle speeds. In addition torques can be easily cancelled by opening generator (3) circuit during the short time of the gears engagement.

In emergency braking the wheels might suddenly be jammed and some over torques might occur in the power-train. A sliding disc (86) is inserted between the flywheel (85) and the pinion (80) to prevent any over torque on all the shafts of the power-train thank to the torques proportionality in planetary gears mechanisms.

Figure 6:
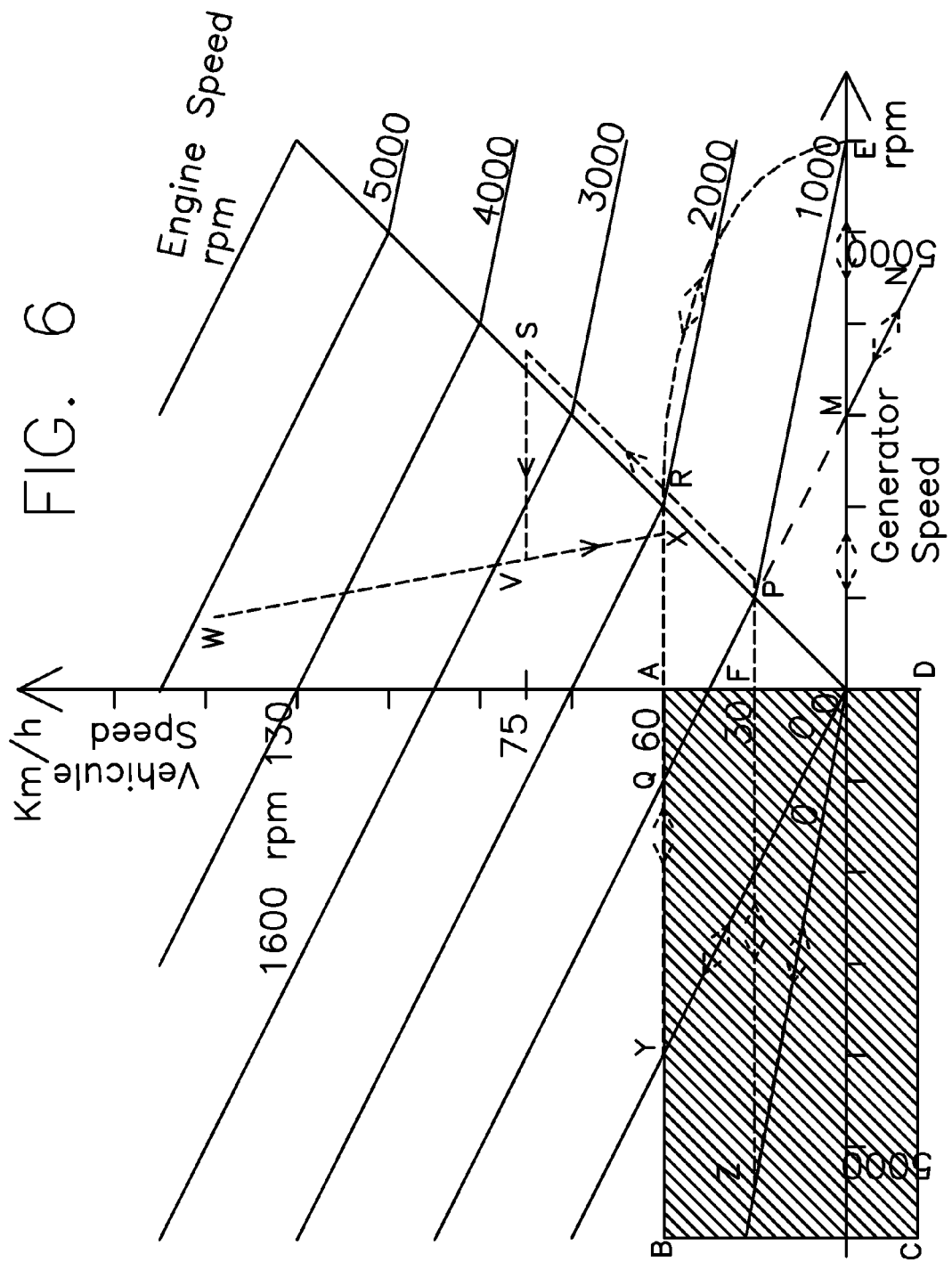
FIG. 6 represents the characteristics of the two planetary gears mechanisms.

FIG. 6 represents the characteristics of the two planetary gears mechanisms as described in the patent application U.S. Ser. No. 13/118,662. On this graph we have added the typical routes to take advantage of the present invention.

In the hatched zone ABCD the vehicle is in electric operation mode. Note that we have preferred the zone where the generator gets negative rotation speed for reasons which will be explained latter.

Route ERSVWXRE represents a hybrid operation mode with the thermal and the electric propulsion at the same time.

On the route from E to R, the speed of the vehicle increases up to 60 km/h whereas the generator and so the flywheel rotation speed decreases from 6000 to 2500 rpm. The generator slows down while the flywheel is losing its kinetic energy. The generator current is send to the electrical motor for increasing the vehicle kinetic energy. By choosing ER according to a parabolic law and by dimensioning the flywheel correctly, we can compensate the vehicle inertia. On the opposite way, there is a transfer of the kinetic energy of the vehicle to the flywheel through the electrical link.

On the route RS, the inertia of the flywheel is added to the inertia of the vehicle but this disadvantage is limited because the flywheel roughly gets only a quarter of its maximum kinetic energy. Thus this energy will be helpful to maintain the vehicle speed during the shifting of the planetary gears mechanisms on the next route from S to V. Because we have to shut down the generator torque, and consequently, all the planetary gears mechanisms torques are null a short time during the shifting.

The route WX represents the high speed operation. One sees that for very important variations of the vehicle speed, for instance from 60 to 130 km/h, the rotation speed of the generator, therefore those of the flywheel, varies little. Consequently, the flywheel is very effective with the low speed train while it has little effect with the high-speed train, what we are looking for.

On the route YQ the flywheel brings a significant part of the energy required to start the thermal engine from 0 to 1000 rpm, then the engine itself can re-accelerate the flywheel from A to X or R depending of the chosen train. This function is important because at the maximum speed of the vehicle in electric mode, the available power to start the thermal engine might be missing. The flywheel assistance avoids an oversizing of the electrical motor and brings flexibility. Note that in A we can take the opportunity to lock the pilot shaft and then run in pure thermal mode high speed.

The route ZP can have the same function with the low speed train. However with this last, the relative contribution of the flywheel to the engine startup is lower due to the kinematic. Note that in F we can take the opportunity to lock the pilot shaft and then run in pure thermal mode low speed.

Consequently the device according to the invention has three starting modes of the thermal engine: a standstill vehicle mode, an electric running mode with the high speed train, an electric running mode with the low speed train.

In the electric running mode the generator and its flywheel are synchronized then geared with one of the pilot shaft of the planetary gears mechanisms just before starting the thermal engine.

To approach the rotation speed of the chosen pilot shaft as more as possible and to accelerate the synchronization, under electric mode the generator or the flywheel stores the kinetic energy in opposite speed direction with that in hybrid operation main mode. The main hybrid mode is defined by a positive rotation speed of the generator when the generator is not working as a motor.

Note also that the kinetic energy storage in the flywheel is also working in pure electric mode by using the generator as a motor and the motor as a generator. It is important because the mileage capacity is very limited in electric mode and it is better to save energy.

On the route MN the vehicle is in reverse gear by using the planetary gears mechanism dedicated to the high speeds even if the vehicle reverse speed is very low. To use high speed train instead of low speed train in that case limits the maximum speed of the generator and allows a much better arrangement and compromise between the generator, the motor and the gear reducer for the wheels.

Note that the selector (7) preferably has a neutral position for shifting planetary gears mechanisms without having to stop the thermal engine (1) while the vehicle is stopped.

Figure 7:
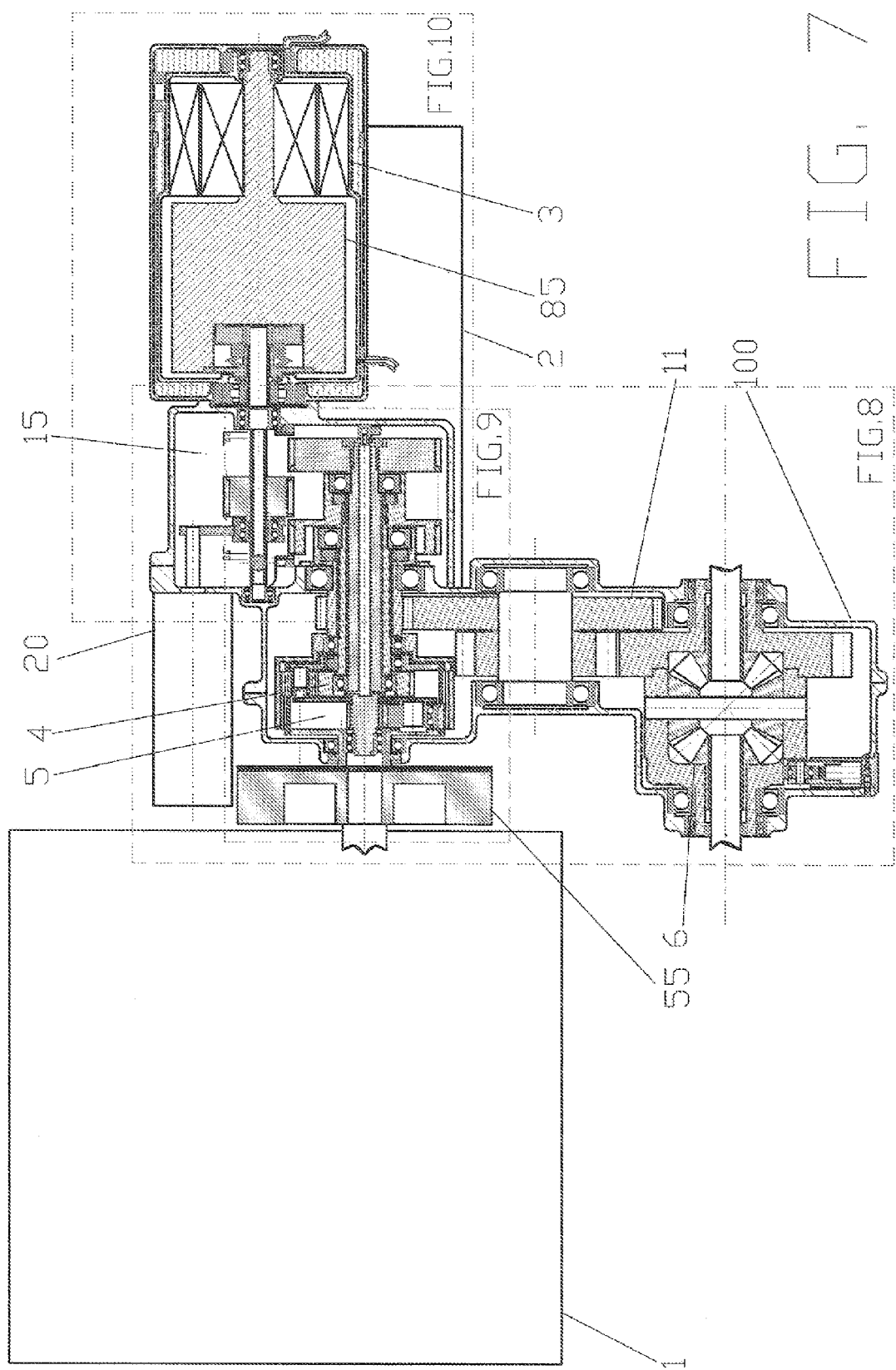
FIG. 7 is a detailed cross section of the power-train option in the FIGS. 3 and 5. option.

FIG. 7 is a detailed cross section of the power-train with the option basically defined on the FIGS. 3 and 5. The figure also shows the limits of next figures for the same option. We can see: the engine (1) with its damper (55), the two planetary gears mechanisms (4) (5) and their selector (15) with its actuator (20), the differential (6) to the wheels through the gear reducer (11), the flywheel (85) associated with the generator (3) and the motor (2). This last is supposed to be geared with the reducer (11) or the gear (41).

Figure 8:
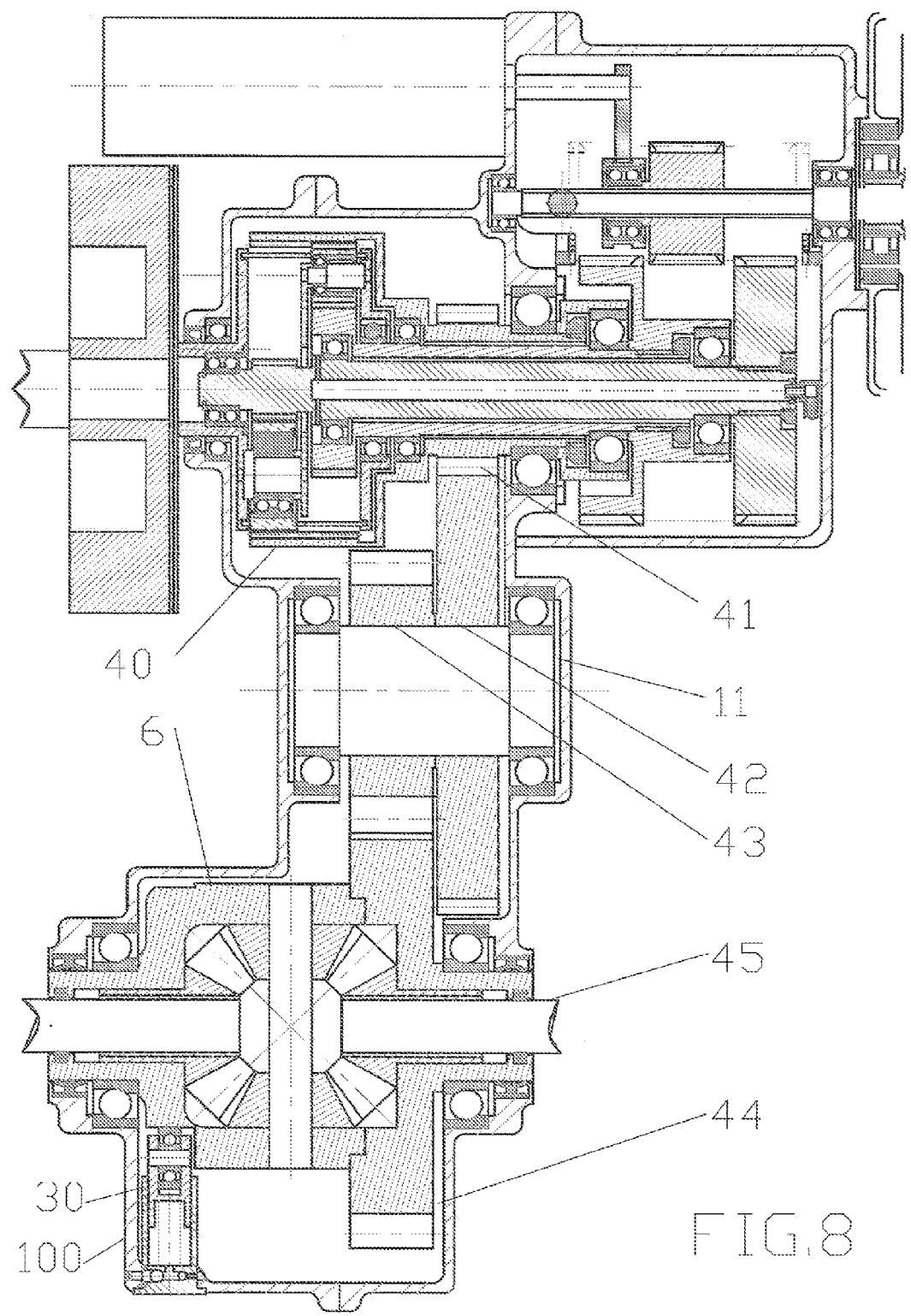
FIG. 8 is a cross section of the lower part of the power-train showing the connection to the wheels in the FIG. 7. option.

FIG. 8 is a cross section of the lower part of the power-train showing the connection to the wheels. The ring gear (40) common to the two planetary gears mechanisms is connected to the wheels through the following gears: (41), (42), (43), (44), the differential (6), then the wheel shafts (45). An oil pump (30) installed at the lower part of the housing (100) is actuated by an eccentric shape on the differential (6) in order to insure the lubrication and the cooling of the power-train.

Figure 9:
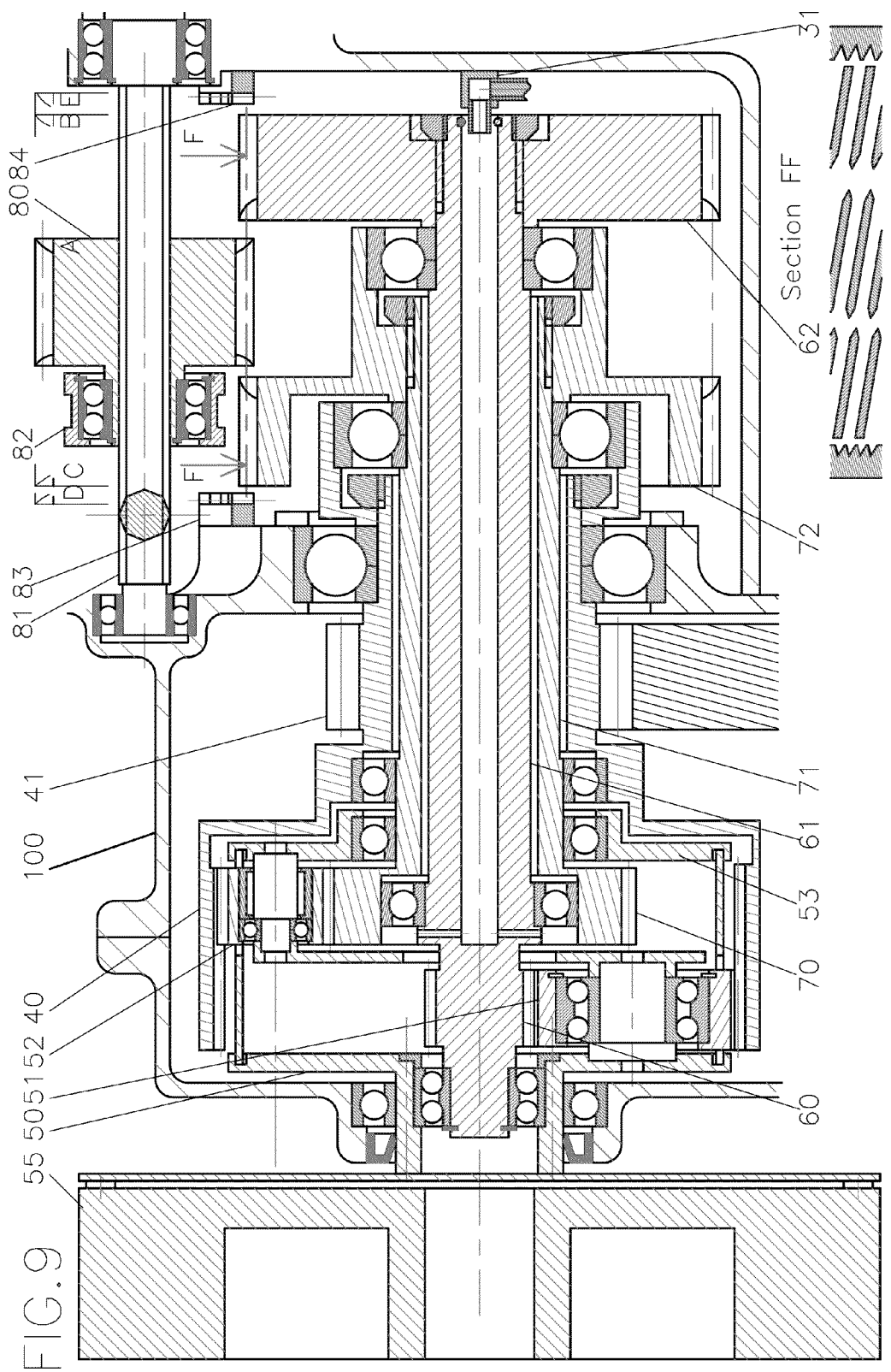
FIG. 9 is a cross section of the double planetary gears mechanisms and its selector in FIG. 7 option.

FIG. 9 is a cross section of the double planetary gears mechanisms and its selector. The pins of the free planetary gears (51) and (52) are hold on the rotating flanges (50) and (53) which are themselves driven by the thermal engine through the vibration damper (55). The low speed connection to the generator (3) is made by the following chain: the gears (60), (62), (80) and the shaft (61). The high speed connection to the generator is made by the following chain: the gears (70), (72), (80) and the shaft (71). The pinion (80) can axially slide on the generator shaft (81) to reach up to five positions: A=neutral position and pure electric mode, B=geared with (62) for hybrid mode at low vehicle speed, C=geared with (72) for hybrid mode at high vehicle speed, E=geared with (84) and (62) which are immobilized for parking mode and pure thermal mode at low vehicle speed, D=geared with (83) and (72) which are immobilized for pure thermal mode at high vehicle speed.

The cross section FF provides details about gears teeth arrangement.

To summarize; the selector of the planetary gears mechanism is based on a pinion which can axially slide along the generator shaft to engage the gear of the chosen pilot shaft after synchronization.

The amplitude of the pinion movement is extended a little bit to engage its lateral front teeth with one of the two fixed gears at each end in order to lock the pilot shaft in operation. Theses extensions are useful to get engine brake while vehicle is parked and to get pure thermal mode.

The injector (31) insures the lubricating and the cooling of the planetary gears mechanisms.

Figure 10:
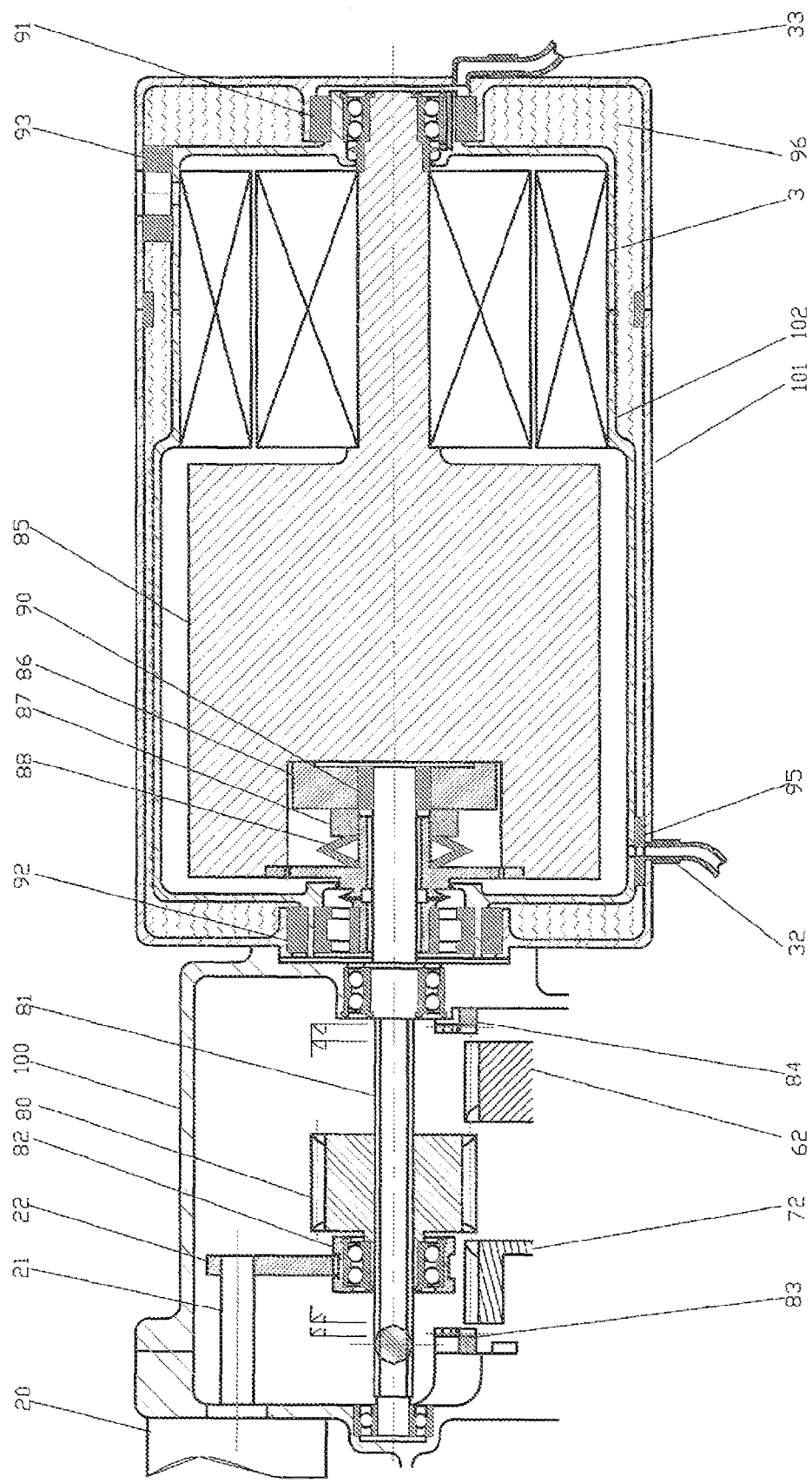
FIG. 10 is a cross section of the generator (3) associated with the flywheel in FIG. 7 option.

FIG. 10 is a cross section of the generator (3) associated with the flywheel (85). The rotor of the generator and the flywheel both rotate inside the housing (102). The housing (102) is springy supported inside a second housing (101) in order to filter vibrations and noises. The spring supports (92) and (91) are preferably made of elastomer for tightening the space between the two housing (101) and (102). This space can receive some cooling water (96). The system can be equipped with a safety torque limiter made of a large disc (86) pressed against the flywheel (85) by a small disc (87) made of low friction material and thrusted by a spring (88) system. In case of over torque the large disc (86) is sliding on the flywheel (85). The heat is preferably absorbed by the mass of the flywheel because of the larger diameter and the higher friction factor of the large disc (86) than the small disc (87).

To summarize, the energy released by the excessive couples on the vehicle power-train is directed toward the flywheel which has some capacity to absorb heat. For that the torque limiter directs the heat by the way of a large disc pushed against the flywheel via a small ring of low friction coefficient, which is itself pushed by a spring.

The generator shaft and the large disc (86) get a springy coupling (90) to filter lateral vibration.

The actuator (20) can shift and position the pinion (80) on the generator shaft (81) thank to a thrust bearing (82) and rods (21) and (22).

The oil drains (32), (95) and (33) collect and send any oil leaks to the lower part of the housing (100). The cable gland (93) is a tight entry for power and instrumentation cables.

It is to be understood that the present invention may be embodied with various other non-illustrated changes which may occur to those skill in the art without departing from the spirit of this invention.

The invention claimed is:

1. A power transmitting system for hybrid vehicle comprising:
    first and second planetary gear mechanisms for power derivation, each having an input shaft, an output shaft and a pilot shaft, the first planetary gear mechanism (5) having a gear ratio dedicated to high vehicle speeds, the second planetary gear mechanism (4) having a gear ratio dedicated to low vehicle speeds;
    a selector (7) for choosing one of the first and second planetary gear mechanisms (4) or (5) to be in operation;
    an electric generator (3), capable of working as a motor, having a rotor coupled to a flywheel (85);
    an electric motor (2) able to absorb power from the generator (3) and work as a generator;
    a battery able to absorb or to restitute a balance of electric power from at least one of the electric generator and the electric motor;
    an engine (1) including an engine shaft;
    the input shafts of the first and second planetary gear mechanisms (4) and (5) are connected to the engine shaft (1) to receive power;
    the output shafts of the first and second planetary gear mechanisms (4) and (5) and the electric motor (2) are connected to an axle (6) which drives vehicle wheels;
    the selector (7) alternatively connects and disconnects each one the pilot shafts of the first and second planetary gear mechanisms (4) and (5) to the generator (3).

2. The power transmitting system of claim 1, wherein said flywheel (85) is coupled to the rotor of said generator (3) through a step up gears system or a pulleys and belt system.

3. The power transmitting system of claim 1, wherein a shaft of said flywheel (85) or said generator (3) includes a torque limiter to protect all shafts of the power transmitting system against over torques.

4. The torque limiter of claim 3, wherein the heat generated by an over torque is directed toward said flywheel (85) by a disc (86) springily pushed against the flywheel (85) via a smaller ring (87) which has a lower friction coefficient than the disc (86).

5. The power transmitting system of claim 1, wherein in an electric mode, the rotor of said generator (3) and said flywheel (85) store the kinetic energy of the vehicle in an opposite speed direction with those in a main hybrid operation mode.

6. The power transmitting system of claim 1, wherein the rotor of said generator (3) is synchronized, then geared with said pilot shaft of the chosen one of the first and second planetary gear mechanisms (4) or (5) before starting said engine (1) during a shift from electrical mode to hybrid mode.

7. The power transmitting system of claim 1, wherein said selector (7) comprises a sliding pinion (80) on a shaft of the generator (3) which can mesh with a gear (62) or (72) of a chosen one of the pilot shafts.

8. The power transmitting system of claim 7, wherein said sliding pinion (80) has fewer teeth than said gears (62) or (72) of the pilot shafts in order to mix the selection of pilot shaft function with the generator (3) speed up function.

9. The power transmitting system of claim 7, wherein a stroke of said sliding pinion (80) is extended in order to mesh front teeth of one of two fixed gears (83) or (84) at each end of the stroke while the pinion (80) is still meshing with one of the gears (62) or (72) of the pilot shafts.

10. The power transmitting system of claim 9, wherein said selector (7) provides up to five positions: a neutral position and a pure electric mode, a hybrid mode at low vehicle speed, a hybrid mode at high vehicle speed, a parking mode, a pure thermal mode at low vehicle speed, and a pure thermal mode at high vehicle speed.

* * * * *